(12) United States Patent
Jones

(10) Patent No.: US 10,569,687 B1
(45) Date of Patent: Feb. 25, 2020

(54) TAILGATE CADDY

(71) Applicant: Atiba Jones, Harper Woods, MI (US)

(72) Inventor: Atiba Jones, Harper Woods, MI (US)

( * ) Notice: Subject to any disclaimer, the term of this patent is extended or adjusted under 35 U.S.C. 154(b) by 66 days.

(21) Appl. No.: 16/037,049

(22) Filed: Jul. 17, 2018

(51) Int. Cl.
| | |
|---|---|
| *B60R 9/02* | (2006.01) |
| *B60N 3/00* | (2006.01) |
| *B60N 3/10* | (2006.01) |
| *B60P 3/025* | (2006.01) |
| *B60R 9/06* | (2006.01) |
| *B60N 3/16* | (2006.01) |
| *B60P 3/36* | (2006.01) |

(52) U.S. Cl.
CPC ............. *B60N 3/002* (2013.01); *B60N 3/102* (2013.01); *B60N 3/103* (2013.01); *B60N 3/16* (2013.01); *B60P 3/0257* (2013.01); *B60P 3/36* (2013.01); *B60R 9/02* (2013.01); *B60R 9/06* (2013.01); *H01R 2201/26* (2013.01)

(58) Field of Classification Search
USPC ........................................................ 296/37.6
See application file for complete search history.

(56) References Cited

U.S. PATENT DOCUMENTS

| | | | |
|---|---|---|---|
| 2,867,471 A | 1/1959 | Coon | |
| 4,705,317 A * | 11/1987 | Henri | ..................... B62D 33/02 224/404 |
| D367,202 S | 2/1996 | Antolin | |
| 5,620,124 A * | 4/1997 | Geier | ..................... B60P 7/0815 224/404 |
| 5,868,295 A * | 2/1999 | Carriere | ..................... B60R 9/00 224/404 |
| 6,254,160 B1 | 7/2001 | Marriott | |
| 6,698,634 B2 | 3/2004 | Thomson | |
| 6,814,383 B2 | 11/2004 | Reed | |
| 6,827,385 B2 * | 12/2004 | Mobley | ..................... B60R 9/00 296/37.6 |
| 9,840,205 B1 * | 12/2017 | Marquez | ................... B60R 9/02 |
| 10,005,501 B2 * | 6/2018 | Povinelli | .................. B60J 7/141 |
| 2009/0127306 A1 | 5/2009 | Mims | |
| 2012/0080467 A1 | 4/2012 | Irwin | |
| 2013/0270854 A1 * | 10/2013 | Weller | ..................... B60R 9/00 296/37.6 |

FOREIGN PATENT DOCUMENTS

EP 0229556 11/1991

\* cited by examiner

*Primary Examiner* — Pinel E Romain
(74) *Attorney, Agent, or Firm* — Kyle A. Fletcher, Esq.

(57) ABSTRACT

The tailgate caddy is an apparatus used to organize items during a celebration. The tailgate caddy is configured for use with a pickup truck. The tailgate caddy mounts in the pickup truck. The tailgate caddy organizes and stores items used during outdoor celebrations located proximal to the pickup truck. The tailgate caddy provides electrical power for use in proving power to electrically powered devices associated with the outdoor celebration. The tailgate caddy comprises a bed liner, a tailgate liner, a living hinge, and a plurality of saddlebags. The living hinge attaches the bed liner to the tailgate liner. The plurality of saddlebags attach to the bed liner. The bed liner rests on the bed. The tailgate liner rests on the tailgate when the tailgate is in a horizontal position. Each of the plurality of saddlebags hangs over a sidewall.

20 Claims, 3 Drawing Sheets

TAILGATE CADDY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including vehicle fittings, more specifically, an arrangement for holding articles not otherwise provided for characterized by the external position of the arrangement.

SUMMARY OF INVENTION

The tailgate caddy is an apparatus used to organize items during a celebration. The tailgate caddy is configured for use with a pickup truck. The pickup truck is further defined with a bed, a tailgate, a starboard sidewall, a port sidewall, a starboard wheel well, a port wheel well, and an end wall. The tailgate caddy mounts in the pickup truck. The tailgate caddy organizes and stores items used during outdoor celebrations located proximal to the pickup truck. The tailgate caddy provides electrical power for use in proving power to electrically powered devices associated with the outdoor celebration. The tailgate caddy comprises a bed liner, a tailgate liner, a living hinge, and a plurality of saddlebags. The living hinge attaches the bed liner to the tailgate liner. The plurality of saddlebags attach to the bed liner. The bed liner rests on the bed. The tailgate liner rests on the tailgate when the tailgate is in a horizontal position. Each of the plurality of saddlebags hangs over sidewall selected from the group consisting of the starboard sidewall and the port sidewall.

These together with additional objects, features and advantages of the tailgate caddy will be readily apparent to those of ordinary skill in the art upon reading the following detailed description of the presently preferred, but nonetheless illustrative, embodiments when taken in conjunction with the accompanying drawings.

In this respect, before explaining the current embodiments of the tailgate caddy in detail, it is to be understood that the tailgate caddy is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tailgate caddy.

It is therefore important that the claims be regarded as including such equivalent construction insofar as they do not depart from the spirit and scope of the tailgate caddy. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
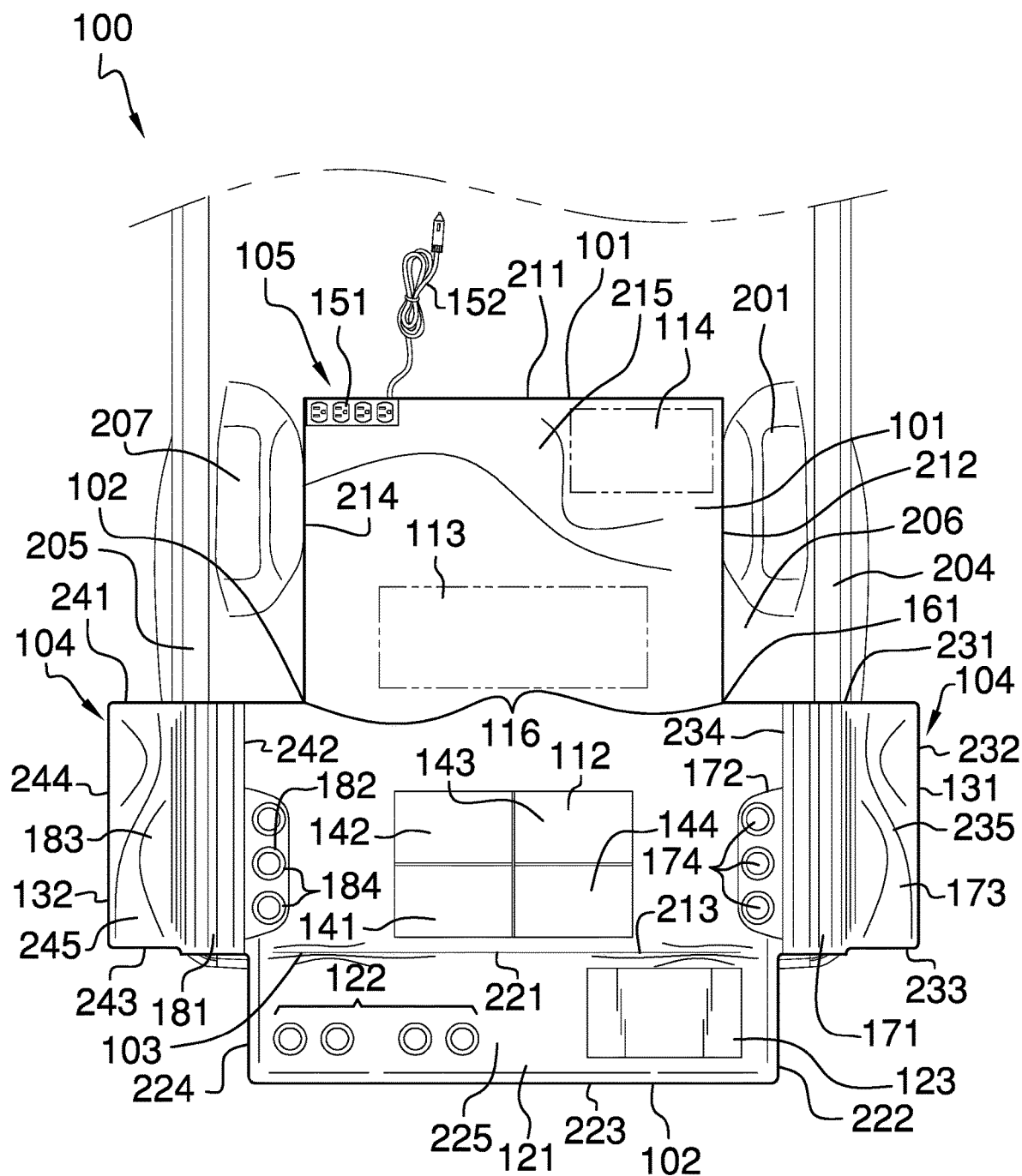
FIG. 1 is a top view of an embodiment of the disclosure.
Figure 2:
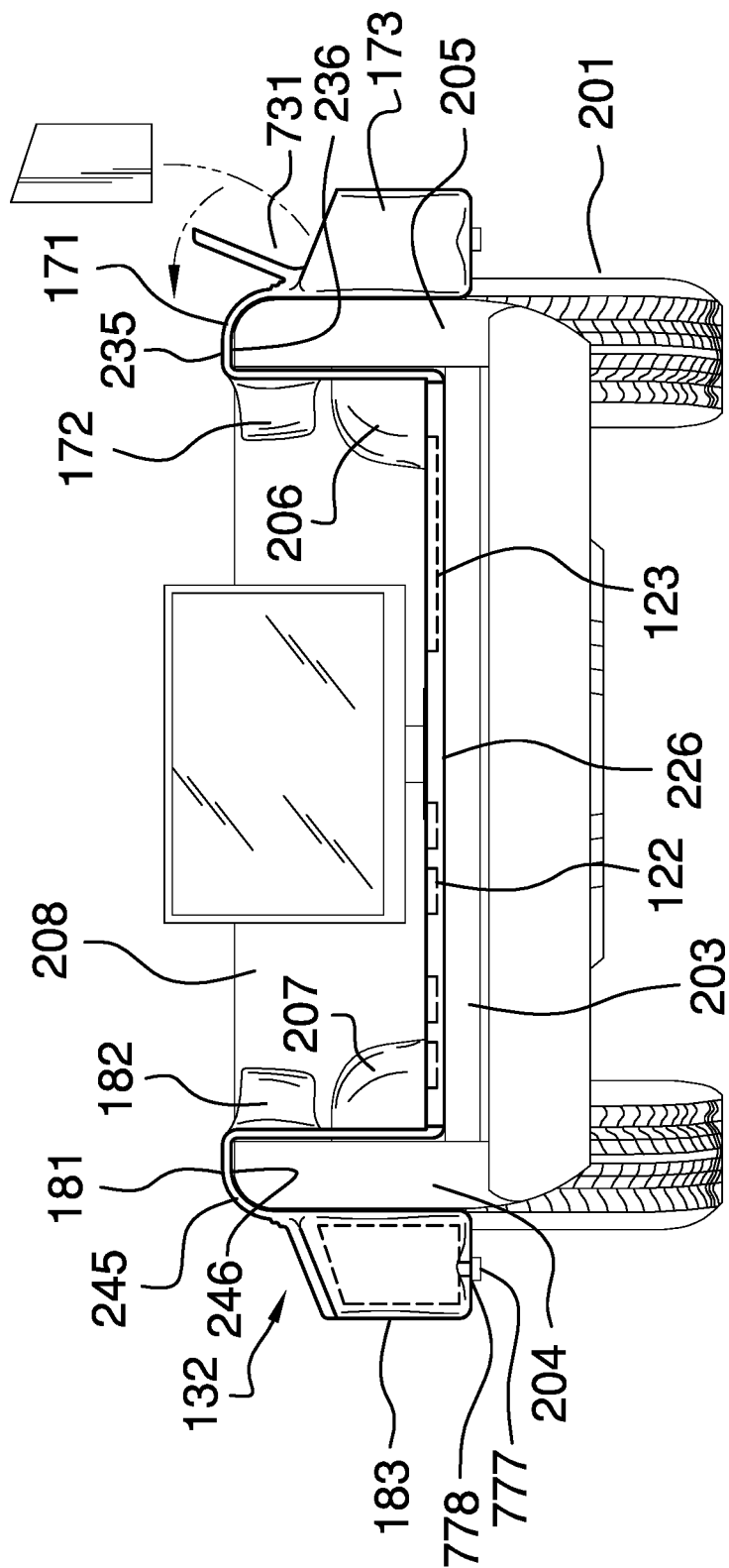
FIG. 2 is a posterior view of an embodiment of the disclosure.
Figure 3:
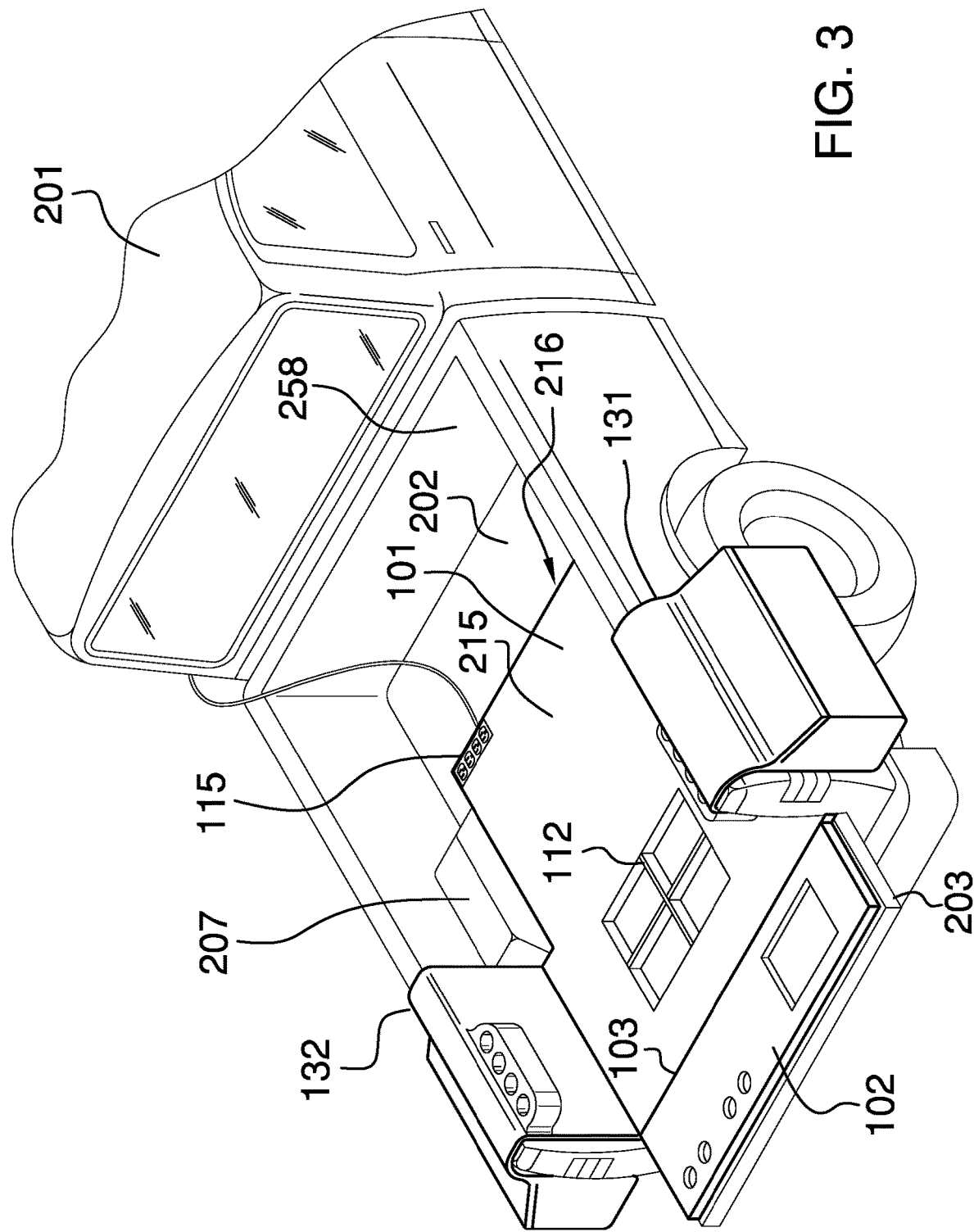
FIG. 3 is a perspective view of an embodiment of the disclosure.

Detailed reference will now be made to one or more potential embodiments of the disclosure, which are illustrated in FIGS. 1 through 3.

The tailgate caddy 100 (hereinafter invention) is an apparatus used to organize items during a celebration. The invention 100 is configured for use with a pickup truck 201. The pickup truck 201 is further defined with a bed 202, a tailgate 203, a starboard sidewall 204, a port sidewall 205, a starboard wheel well 206, a port wheel well 207, and an end wall 208. The invention 100 mounts in the pickup truck 201. The invention 100 organizes and stores items used during outdoor celebrations located proximal to the pickup truck 201. The invention 100 provides electrical power for use in proving power to electrically powered devices associated with the outdoor celebration.

The invention 100 comprises a bed 202 liner 101, a tailgate 203 liner 102, a living hinge 103, and a plurality of saddlebags 104. The living hinge 103 attaches the bed 202 liner 101 to the tailgate 203 liner 102. The plurality of saddlebags 104 attach to the bed 202 liner 101. The bed 202 liner 101 rests on the bed 202. The tailgate 203 liner 102 rests on the tailgate 203 when the tailgate 203 is in a horizontal position. Each of the plurality of saddlebags hangs over sidewall selected from the group consisting of the starboard sidewall 204 and the port sidewall 205.

The bed 202 liner 101 is the structure of the invention 100 that rests on the bed 202 of the pickup truck 201. The bed 202 liner 101 is a plate. The bed 202 liner 101 forms a rectilinear block structure. The bed 202 liner 101 forms a level horizontal surface on the bed 202 of the pickup truck 201. The bed 202 liner 101 forms a platform upon which items associated with a celebration can be placed. The bed 202 liner 101 comprises a rectilinear plate 111, a plurality of food trays 112, a television tray 113, a waste tray 114, and a power strip 115. The rectilinear plate 111 is further defined with a first bow edge 211, a first starboard edge 212, a first stern edge 213, a first port edge 214, a first superior surface 215, and a first inferior surface 216.

The first bow edge 211 is the edge of the rectilinear plate 111 that is proximal to the end wall 208 of the pickup truck 201. The first starboard edge 212 is the edge of the rectilinear plate 111 that is proximal to the starboard sidewall 204 of the pickup truck 201. The first stern edge 213 is the edge of the rectilinear plate 111 that is distal from the first bow edge 211. The first port edge 214 is the edge of the rectilinear plate 111 that is distal from the first starboard edge 212. The first superior surface 215 is the surface of the rectilinear plate 111 that is distal from the first inferior surface 216. The first inferior surface 216 is the surface of the rectilinear plate 111 that is proximal to the bed 202 of the pickup truck 201.

The rectilinear plate 111 is a rectilinear block structure that forms the base of the bed 202 liner 101. The rectilinear plate 111 is geometrically similar to the bed 202 of the pickup truck 201. The rectilinear plate 111 lays on top of the bed 202 of the pickup truck 201.

Each of the plurality of food trays 112 is a cavity formed within the rectilinear plate 111. Each of plurality of food trays 112 forms a tray-like structure that contains one or more objects within the plurality of food trays 112. The plurality of food trays 112 comprises a first food tray 141, a second food tray 142, a third food tray 143, and a fourth food tray 144.

The television tray 113 is a cavity formed within the rectilinear plate 111. The television tray 113 is sized to receive a television. The television tray 113 forms a tray-like structure that prevents the television from shifting while on the rectilinear plate 111. The waste tray 114 is a cavity formed within the rectilinear plate 111. The waste tray 114 is sized to receive a trash can. The waste tray 114 forms a tray-like structure that prevents the trash can from shifting while on the rectilinear plate 111.

The power strip 115 is an electrical distribution device that provides electrical power for electrically powered devices that are used with the invention 100. The power strip 115 comprises a plurality of NEMA electrical ports 151 and a cigarette lighter electrical plug 152. The plurality of NEMA electrical ports 151 is a device that receives electricity from the electrical system of the pickup truck 201 through the cigarette lighter electrical plug 152. The plurality of NEMA electrical ports 151: a) converts the electricity received from the pickup truck 201 into a 120 Vac electrical source; and, b) distributes the converted AC electricity to electrical devices using a plurality of NEMA 5-15 electrical sockets. The cigarette lighter electrical plug 152 is a standardized and commercially available electrical plug that connects the plurality of NEMA electrical ports 151 to the electrical system of the pickup truck 201.

The bed 202 liner 101 further comprises a plurality of wheel well notches 116. The plurality of wheel well notches 116 is a notch that is formed along an edge of the rectilinear plate 111 selected from the group consisting of the first starboard edge 212 and the first port edge 214. Each of the plurality of wheel well notches 116 creates a space that allows the rectilinear plate 111 to fit around the starboard wheel well 206 and the port wheel well 207. The plurality of wheel well notches 116 comprises a starboard wheel well notch 161 and a port wheel well notch 162.

The starboard wheel well notch 161 is a notch that is formed in the first starboard edge 212 of the rectilinear plate 111. The starboard wheel well notch 161 is positioned to receive the starboard wheel well 206 of the pickup truck 201 when the rectilinear plate 111 installs in the bed 202. The port wheel well notch 162 is a notch that is formed in the first port edge 214 of the rectilinear plate 111. The port wheel well notch 162 is positioned to receive the port wheel well 207 of the pickup truck 201 when the rectilinear plate 111 installs in the bed 202.

The tailgate 203 liner 102 is the structure of the invention 100 that rests on the tailgate 203 of the pickup truck 201. The tailgate 203 liner 102 is a plate. The tailgate 203 liner 102 forms a rectangular block structure. The tailgate 203 liner 102 forms a level horizontal surface on the tailgate 203 of the pickup truck 201 when the tailgate 203 is in a horizontal position. The tailgate 203 liner 102 forms a platform upon which items associated with a celebration can be placed. The tailgate 203 liner 102 comprises a rectangular plate 121, a first plurality of cup holders 122, and a utility tray 123. The rectangular plate 121 is further defined with a second bow edge 221, a second starboard edge 222, a second stern edge 223, a second port edge 224, a second superior surface 225, and a second inferior surface 226.

The second bow edge 221 is the edge of the rectangular plate 121 that is proximal to the bed 202 of the pickup truck 201. The second starboard edge 222 is the edge of the rectangular plate 121 that aligns with the first starboard edge 212 of the rectilinear plate 111. The second stern edge 223 is the edge of the rectangular plate 121 that is distal from the second bow edge 221. The second port edge 224 is the edge of the rectangular plate 121 that is distal from the second starboard edge 222. The second superior surface 225 is the surface of the rectangular plate 121 that is distal from the first inferior surface 216. The second inferior surface 226 is the surface of the rectangular plate 121 that is proximal to the tailgate 203 of the pickup truck 201.

The rectangular plate 121 is a rectangular block structure that forms the base of the tailgate 203 liner 102. The rectilinear plate 111 is geometrically similar to the tailgate 203 of the pickup truck 201. The rectangular plate 121 lays on top of the tailgate 203 of the pickup truck 201.

Each of the first plurality of cup holders 122 is a cylindrical cavity that is formed in the rectangular plate 121. The first plurality of cup holders 122 is sized to receive a beverage container such that beverage container will not shift when contained in a cup holder selected from the first plurality of cup holders 122.

The utility tray 123 is a cavity formed within the rectangular plate 121. The utility tray 123 is intended to hold miscellaneous items such that these items will not shift when placed in the utility tray 123.

The living hinge 103 is a flexure bearing. The living hinge 103 attaches the tailgate 203 liner 102 to the bed 202 liner 101 such that the tailgate 203 liner 102 rotates relative to the bed 202 liner 101. The living hinge 103 attaches the tailgate 203 liner 102 to the bed 202 liner 101 such that the second superior surface 225 of the tailgate 203 liner 102 forms a level surface with the first superior surface 215 of the bed 202 liner 101 when the tailgate 203 is in a horizontal position. The living hinge 103 attaches the tailgate 203 liner 102 to the bed 202 liner 101 such that the second superior surface 225 of the tailgate 203 liner 102 lays on top of the first superior surface 215 of the bed 202 liner 101 when the invention 100 is stored after use.

Each of the plurality of saddlebags 104 is a flexible structure. Each of the plurality of saddlebags 104 drapes over a sidewall selected from the group consisting of the starboard sidewall 204 and the port sidewall 205. Each of the plurality of saddlebags 104 forms a plurality of vertical surfaces. One or more storage containers attach to the plurality of vertical surfaces formed by each of the plurality of saddlebags 104. The plurality of saddlebags 104 comprises a starboard saddlebag 131 and a port saddlebag 132.

The starboard saddlebag 131 is a containment structure that drapes over the starboard sidewall 204 of the pickup truck 201. The starboard saddlebag 131 provides the temperature controlled storage capability of the invention 100. The starboard saddlebag 131 comprises a starboard sheeting 171, a starboard beverage block 172, and a starboard cooler 173. The starboard sheeting 171 is further defined with a third bow edge 231, a third starboard edge 232, a third stern edge 233, a third port edge 234, a third superior surface 235, and a third inferior surface 236.

The third bow edge 231 is the edge of the starboard sheeting 171 that is proximal to the end wall 208 of the pickup truck 201. The third starboard edge 232 is the edge of the starboard sheeting 171 that is distal from the third port edge of the starboard sheeting 171. The third stern edge 233 is the edge of the starboard sheeting 171 that is distal from the third bow edge 231. The third port edge 234 is the edge of the starboard sheeting 171 that attaches to the first starboard edge 212 of the rectilinear plate 111. The third superior surface 235 is the surface of the starboard sheeting 171 that is distal from the third inferior surface 236 of the rectilinear plate 111. The third inferior surface 236 is the surface of the starboard sheeting 171 that is proximal to the starboard sidewall 204 of the pickup truck 201.

The starboard sheeting 171 is a sheeting that forms the base of the starboard saddlebag 131. The starboard sheeting 171 has a rectangular shape. The starboard sheeting 171 is the structure that drapes over the starboard sidewall 204.

The starboard beverage block 172 is a rectangular block structure. The starboard beverage block 172 attaches to the third superior surface 235 of the starboard sheeting 171. The starboard beverage block 172 comprises a second plurality of cup holders 174. The second plurality of cup holders 174 is a plurality of cylindrical cavities that are formed in the starboard beverage block 172. Each of the second plurality of cup holders 174 is designed to receive a beverage container such that the beverage container will not shift when inserted into a selected cup holder.

The starboard cooler 173 is a commercially available insulated structure. The starboard cooler 173 attaches to the third superior surface 235 of the starboard sheeting 171. The starboard cooler 173 is an insulated structure that is designed to hold foodstuffs at an appropriate storage temperature during the celebration.

The port saddlebag 132 is a containment structure that drapes over the port sidewall 205 of the pickup truck 201. The port saddlebag 132 provides the temperature controlled storage capability of the invention 100. The port saddlebag 132 comprises a port sheeting 181, a port beverage block 182, and a port cooler 183. The port sheeting 181 is further defined with a fourth bow edge 241, a fourth starboard edge 242, a fourth stern edge 243, a fourth port edge 244, a fourth superior surface 245, and a fourth inferior surface 246.

The fourth bow edge 241 is the edge of the port sheeting 181 that is proximal to the end wall 208 of the pickup truck 201. The fourth starboard edge 242 is the edge of the port sheeting 181 that attaches to the first port edge 214 of the rectilinear plate 111. The fourth stern edge 243 is the edge of the port sheeting 181 that is distal from the fourth bow edge 241. The fourth port edge 244 is the edge of the port sheeting 181 that is distal from the fourth starboard edge 242 of the port sheeting 181. The fourth superior surface 245 is the surface of the port sheeting 181 that is distal from the fourth inferior surface 246 of the port sheeting 181. The fourth inferior surface 246 is the surface of the port sheeting 181 that is proximal to the starboard sidewall 204 of the pickup truck 201.

The port sheeting 181 is a sheeting that forms the base of the port saddlebag 132. The port sheeting 181 has a rectangular shape. The port sheeting 181 is the structure that drapes over the port sidewall 205.

The port beverage block 182 is a rectangular block structure. The port beverage block 182 attaches to the fourth superior surface 245 of the port sheeting 181. The port beverage block 182 comprises a third plurality of cup holders 184. The third plurality of cup holders 184 is a plurality of cylindrical cavities that are formed in the port beverage block 182. Each of the third plurality of cup holders 184 is designed to receive a beverage container such that the beverage container will not shift when inserted into a selected cup holder.

The port cooler 183 is a commercially available insulated structure. The port cooler 183 attaches to the fourth superior surface 245 of the port sheeting 181. The port cooler 183 is an insulated structure that is designed to hold foodstuffs at an appropriate storage temperature during the celebration.

The following four paragraphs describe the assembly of the master structure of the invention 100.

The living hinge 103 attaches the first bow edge 211 of the rectilinear plate 111 to the second stern edge 223 of the rectangular plate 121 such that the rectangular plate 121 rotates with the tailgate 203 relative to the rectilinear plate 111.

The third port edge 234 of the starboard sheeting 171 attaches to the first starboard edge 212 of the rectilinear plate 111 such that: a) the corner formed by the intersection of the third stern edge 233 and the third port edge 234 of the starboard sheeting 171 aligns with the corner formed by the intersection of the first starboard edge 212 and the first stern edge 213 of the rectilinear plate 111; and, b) the third inferior surface 236 of the starboard sheeting 171 is in contact with the starboard sidewall 204 as the starboard sheeting 171 drapes over the starboard sidewall 204.

The fourth starboard edge 242 of the port sheeting 181 attaches to the first port edge 214 of the rectilinear plate 111 such that: a) the corner formed by the intersection of the fourth stern edge 243 and the fourth starboard edge 242 of the port sheeting 181 aligns with the corner formed by the intersection of the first port edge 214 and the first stern edge 213 of the rectilinear plate 111; and, b) the fourth inferior surface 246 of the port sheeting 181 is in contact with the port sidewall 205 as the port sheeting 181 drapes over the port sidewall 205.

The first inferior surface 216 of the rectilinear plate 111 lays on the bed 202 of the pickup truck 201. The second inferior surface 226 of the rectangular plate 121 lays on the tailgate 203 of the pickup truck 201. The third inferior surface 236 of the starboard saddlebag 131 drapes over the starboard sidewall 204 of the pickup truck 201. The fourth inferior surface 246 of the port saddlebag 132 drapes over the port sidewall 205 of the pickup truck 201.

The following six paragraphs describe the assembly of the attachments of the invention 100 to the master structure of the invention 100.

The plurality of food trays 112 is formed as a cavity within the first superior surface 215 of the rectilinear plate 111. The first food tray 141 is a rectangularly shaped subdivision of the cavity formed by the plurality of food trays 112. The second food tray 142 is a rectangularly shaped subdivision of the cavity formed by the plurality of food trays 112. The third food tray 143 is a rectangularly shaped subdivision of the cavity formed by the plurality of food trays 112. The fourth food tray 144 is a rectangularly shaped subdivision of the cavity formed by the plurality of food trays 112.

The television tray 113 is formed as a cavity within the first superior surface 215 of the rectilinear plate 111. The waste tray 114 is formed as a cavity within the first superior surface 215 of the rectilinear plate 111. The power strip 115 attaches the first bow edge 211 of the first superior surface 215 of the rectilinear plate 111.

The first plurality of cup holders 122 is formed as a plurality of cavities within the second superior surface 225 of the plurality of food trays 112. The utility tray 123 is formed as a cavity within the second superior surface 225 of the plurality of food trays 112.

The starboard wheel well notch 161 is formed in the first starboard edge 212 of the rectilinear plate 111 such that the starboard wheel well 206 fits into the starboard wheel well notch 161. The port wheel well notch 162 is formed in the first port edge 214 of the rectilinear plate 111 such that the port wheel well 207 fits into the port wheel well notch 162.

The starboard beverage block 172 attaches to the third superior surface 235 of the starboard sheeting 171 such that the starboard beverage block 172 is accessible along the interior side of the starboard sidewall 204. The starboard cooler 173 attaches to the third superior surface 235 of the starboard sheeting 171 such that the starboard cooler 173 is accessible along the exterior side of the starboard sidewall 204. The starboard cooler 173 attaches to the starboard sheeting 171 such that the bottom of the starboard cooler 173 aligns with the third starboard edge 232 of the starboard sheeting 171.

The port beverage block 182 attaches to the fourth superior surface 245 of the port sheeting 181 such that the port beverage block 182 is accessible along the interior side of the port sidewall 205. The port cooler 183 attaches to the fourth superior surface 245 of the port sheeting 181 such that the port cooler 183 is accessible along the exterior side of the port sidewall 205. The port cooler 183 attaches to the port sheeting 181 such that the bottom of the port cooler 183 aligns with the fourth port edge 244 of the port sheeting 181.

It shall be noted that both the starboard cooler 173 and the port cooler 183 may include a drain plug 777, which enables fluid to be drained from the respective cooler. Moreover, the drain plug 777 would be inserted into a drain outlet 778, which is located on a bottom surface 779 of the respective cooler.

The following definitions were used in this disclosure:

AC: As used in this disclosure, AC is an acronym for alternating current.

Aft: As used in this disclosure, aft is a term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Bag: As used in this disclosure, a bag is a container made of a flexible material. The bag has a single opening which allows the bag to receive the items to be contained.

Beverage: As used in this disclosure, a beverage is a liquid that is intended for consumption by a person.

Bow: As used in this disclosure, the bow refers to the anterior side of a vehicle or vessel.

Caddy: As used in this disclosure, a caddy is an apparatus used to organize a plurality of individual items. A caddy will often, but not necessarily, be used to transport the plurality of individual items.

Cigarette Lighter Plug: As used in this disclosure, a cigarette lighter plug is a standardized electrical connection that attaches an electrically powered device to the electric power system of a vehicle.

Correspond: As used in this disclosure, the term correspond is used as a comparison between two or more objects wherein one or more properties shared by the two or more objects match, agree, or align within acceptable manufacturing tolerances.

Cup: As used in this disclosure, a cup is a container that is intended to contain a fluid. The cup has a shape that roughly corresponds to a capped tube. Glass, mug, stein, and tumbler are a synonyms for a cup.

Drape: As used in this disclosure, to drape means to hang a sheeting over at least two sides of a vertically oriented object.

Electrical Plug: As used in this disclosure, an electrical plug is an electrical termination that electrically connects a first electrical circuit to a second electrical circuit or a source of electricity. As used in this disclosure, an electrical plug will have two or three metal pins.

Electrical Port: As used in this disclosure, an electrical port is an electrical termination that is used to connect a first electrical circuit to a second external electrical circuit. In this disclosure, the electrical port is designed to receive an electrical plug.

Flap: As used in this disclosure, a flap is a piece of material that is otherwise attached to a surface using one side such that the piece of material rotates and hangs freely from the surface.

Flexible: As used in this disclosure, flexible refers to an object or material that will deform when a force is applied to it but that will not necessarily return to its original shape when the deforming force is removed.

Flexure Bearing: As used in this disclosure, a flexure bearing is a thin and flexible material that is used to attach, or bind, a first object to a second object such that the first object can rotate in a controlled direction relative to the second object.

Forward: As used in this disclosure, forward is a term that relates a first object to a second object. When the first object is closer to the bow of a vehicle, the first object is said to be forward of the second object. The term is commonly used on vessels and vehicles.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Insulating Structure: As used in this disclosure, an insulating structure is a structure that inhibits, and ideally prevents, the transfer of heat through the insulating structure. Insulating structures may also be used to inhibit or prevent the transfer of sound through the insulating structure. Methods to form insulating structures include, but are not limited to: 1) the use of materials with low thermal conductivity; and, 2) the use of a structural design that places a vacuum within the insulating structure within the anticipated transfer path of the heat or sound.

Living Hinge: As used in this disclosure, refers to a single object that is formed out of elastomeric material that is divided into a first segment, a second segment and the living hinge. The elastic nature of the elastomeric material allow the living hinge to be flexed in the manner of a hinge allowing the first segment to rotate relative to the second hinge. The living hinge is a form of a flexure bearing. A material that is formed with a series of parallel living hinges is referred to as a kerf bending. A kerf bending formed in a plate allows the plate to bend into a curved shape.

NEMA 5-15 Electrical Socket: As used in this disclosure, the NEMA 5-15 electrical socket is a port designed to provide electric power drawn from the National Electric Grid. The NEMA 5-15 electrical socket is commonly used to deliver electrical power to electric devices in residential, office, and light industrial settings. The typical NEMA5-15 electrical socket comprises a plurality of electric ports from which electric power is drawn. The position of each of the plurality of electric ports is placed in a standardized position. The typical NEMA5-15 electrical socket further comprises a plate hole which is a standardized hole located in a standardized position within the NEMA 5-15 electrical socket that is designed to receive a bolt that is used to attach a faceplate to the NEMA 5-15 electrical socket. The NEMA 5-15 electrical socket is also commonly referred to as an electrical outlet.

Notch: As used in this disclosure, a notch is: 1) an indentation formed in an edge; or 2) a cavity or aperture formed within a surface.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a left sidewall, a right sidewall, and an end wall.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance. As defined in this disclosure, plates may be made of any material, but are commonly made of metal, plastic, and wood. When made of wood, a plate is often referred to as a board.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the front of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Rectangular Block: As used in this disclosure, a rectangular block refers to a three-dimensional structure comprising six rectangular surfaces formed at right angles. Within this disclosure, a rectangular block may further comprise rounded edges and corners.

Rounded: A used in this disclosure, the term rounded refers to the replacement of an apex, vertex, or edge or brink of a structure with a (generally smooth) curvature wherein the concave portion of the curvature faces the interior or center of the structure.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rectilinear Block: As used in this disclosure, a rectilinear block refers to a three-dimensional structure comprising a plurality of rectangular surfaces. Rectilinear blocks are similar to rectangular blocks and are often used to create a structure with a reduced interior volume relative to a rectangular block. Within this disclosure, a rectilinear block may further comprise rounded edges and corners.

Sheeting: As used in this disclosure, a sheeting is a material, such as a textile, a plastic, or a metal foil, in the form of a thin flexible layer or layers.

Starboard: As used in this disclosure, starboard refers to the right side of a vehicle when a viewer is facing towards the primary sense of direction of the vehicle.

Stern: As used in this disclosure, the stern refers to the posterior side of a vehicle or vessel.

Superior: As used in this disclosure, the term superior refers to a directional reference that is parallel to and in the opposite direction of the force of gravity.

Tray: As used in this disclosure, a tray is a flat plate-like structure that has a raised rim formed around the perimeter to contain fluids within the structure of the tray. Trays will generally give an impression of being a shallow containment device. Trays are often used for carrying food and drink or for holding small items.

Vac: As used in this disclosure, Vac is an abbreviation for alternating current voltage.

Vdc: As used in this disclosure, Vdc is an abbreviation for direct current voltage.

Vehicle: As used in this disclosure, a vehicle is a motorized device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An arrangement for organizing articles comprising:
a bed liner, a tailgate liner, a living hinge, and a plurality of saddlebags;
wherein the living hinge attaches the bed liner to the tailgate liner;
wherein the plurality of saddlebags attach to the bed liner;
wherein the bed liner rests on the bed;
wherein the tailgate liner rests on the tailgate when the tailgate is in a horizontal position;
wherein each of the plurality of saddlebags hangs over sidewall selected from the group consisting of the starboard sidewall and the port sidewall;
wherein the arrangement for organizing articles is configured for use with a pickup truck;
wherein the pickup truck is further defined with a bed, a tailgate, a starboard sidewall, a port sidewall, a starboard wheel well, a port wheel well, and an end wall;
wherein the arrangement for organizing articles mounts in the pickup truck;
wherein the arrangement for organizing articles distributes electrical power.

2. The arrangement for organizing articles according to claim 1
wherein the bed liner is a plate;
wherein the bed liner forms a rectilinear block structure;
wherein the bed liner forms a level horizontal surface on the bed of the pickup truck;
wherein the tailgate liner is a plate;
wherein the tailgate liner forms a rectangular block structure;
wherein the tailgate liner forms a level horizontal surface on the tailgate of the pickup truck when the tailgate is in a horizontal position;
wherein the living hinge is a flexure bearing;
wherein the living hinge attaches the tailgate liner to the bed liner such that the tailgate liner rotates relative to the bed liner;
wherein each of the plurality of saddlebags is a flexible structure;
wherein each of the plurality of saddlebags drapes over a sidewall selected from the group consisting of the starboard sidewall and the port sidewall;
wherein each of the plurality of saddlebags forms a plurality of vertical surfaces.

3. The arrangement for organizing articles according to claim 2
wherein the bed liner comprises a rectilinear plate, a plurality of food trays, a television tray, a waste tray, and a power strip;
wherein the rectilinear plate is geometrically similar to the bed of the pickup truck;
wherein the plurality of food trays, the television tray, and the waste tray are formed in the rectilinear plate,
wherein the power strip attaches to the rectilinear plate;
wherein the rectilinear plate is further defined with a first bow edge, a first starboard edge, a first stern edge, a first port edge, a first superior surface, and a first inferior surface.

4. The arrangement for organizing articles according to claim 3
wherein each of the plurality of food trays is a cavity formed within the rectilinear plate;
wherein each of the plurality of food trays a tray structure;
wherein the television tray is a cavity formed within the rectilinear plate;
wherein the television tray forms a tray structure;
wherein the waste tray is a cavity formed within the rectilinear plate;
wherein the waste tray forms a tray structure.

5. The arrangement for organizing articles according to claim 4
wherein the power strip is an electrical distribution device;
wherein the power strip comprises a plurality of NEMA electrical ports and a cigarette lighter electrical plug;
wherein the plurality of NEMA electrical ports is a device that receives electricity from the electrical system of the pickup truck through the cigarette lighter electrical plug;
wherein the plurality of NEMA electrical ports: a) converts the electricity received from the pickup truck into a 120 volt alternating current electrical source; and, b) distributes the converted 120 volt alternating current electricity to electrical devices using a plurality of NEMA 5-15 electrical sockets;
wherein the cigarette lighter electrical plug connects the plurality of NEMA electrical ports to the electrical system of the pickup truck.

6. The arrangement for organizing articles according to claim 5
wherein the tailgate liner comprises a rectangular plate, a first plurality of cup holders, and a utility tray;
wherein the rectilinear plate is geometrically similar to the tailgate of the pickup truck;
wherein the first plurality of cup holders and the utility tray are formed in the rectangular plate;
wherein the rectangular plate is further defined with a second bow edge, a second starboard edge, a second stern edge, a second port edge, a second superior surface, and a second inferior surface.

7. The arrangement for organizing articles according to claim 6
wherein each of the first plurality of cup holders is a cylindrical cavity that is formed in the rectangular plate;

wherein the first plurality of cup holders is sized to receive a beverage container such that beverage container will not shift when contained in a cup holder selected from the first plurality of cup holders;

wherein the utility tray is a cavity formed within the rectangular plate.

8. The arrangement for organizing articles according to claim 7 wherein the living hinge attaches the tailgate liner to the bed liner such that the second superior surface of the tailgate liner forms a level surface with the first superior surface of the bed liner when the tailgate is in a horizontal position;

wherein the living hinge attaches the tailgate liner to the bed liner such that the second superior surface of the tailgate liner lays on top of the first superior surface of the bed liner.

9. The arrangement for organizing articles according to claim 8 wherein the plurality of saddlebags comprises a starboard saddlebag and a port saddlebag;

wherein the starboard saddlebag is a containment structure that drapes over the starboard sidewall of the pickup truck;

wherein the port saddlebag is a containment structure that drapes over the port sidewall of the pickup truck;

wherein the port saddlebag provides the temperature controlled storage capability of the arrangement for organizing articles;

wherein the starboard saddlebag provides the temperature controlled storage capability of the arrangement for organizing articles.

10. The arrangement for organizing articles according to claim 9 wherein the starboard saddlebag comprises a starboard sheeting, a starboard beverage block, and a starboard cooler;

wherein the port saddlebag comprises a port sheeting, a port beverage block, and a port cooler;

wherein the starboard beverage block and a starboard cooler attach to the starboard sheeting;

wherein the port beverage block and a port cooler attach to the port sheeting;

wherein the starboard sheeting is further defined with a third bow edge, a third starboard edge, a third stern edge, a third port edge, a third superior surface, and a third inferior surface;

wherein the port sheeting is further defined with a fourth bow edge, a fourth starboard edge, a fourth stern edge, a fourth port edge, a fourth superior surface, and a fourth inferior surface.

11. The arrangement for organizing articles according to claim 10 wherein the starboard sheeting has a rectangular shape;

wherein the port sheeting has a rectangular shape;

wherein the starboard sheeting is the structure that drapes over the starboard sidewall;

wherein the port sheeting is the structure that drapes over the port sidewall.

12. The arrangement for organizing articles according to claim 11 wherein the starboard beverage block is a rectangular block structure;

wherein the port beverage block is a rectangular block structure;

wherein the starboard beverage block attaches to the third superior surface of the starboard sheeting;

wherein the port beverage block attaches to the fourth superior surface of the port sheeting;

wherein the starboard beverage block comprises a second plurality of cup holders;

wherein the port beverage block comprises a third plurality of cup holders;

wherein the second plurality of cup holders is a plurality of cylindrical cavities that are formed in the starboard beverage block;

wherein the third plurality of cup holders is a plurality of cylindrical cavities that are formed in the port beverage block.

13. The arrangement for organizing articles according to claim 12 wherein the starboard cooler is an insulated structure;

wherein the starboard cooler attaches to the third superior surface of the starboard sheeting;

wherein the port cooler is an insulated structure;

wherein the port cooler attaches to the fourth superior surface of the port sheeting.

14. The arrangement for organizing articles according to claim 13 wherein the bed liner further comprises a plurality of wheel well notches;

wherein the plurality of wheel well notches is a notch that is formed along an edge of the rectilinear plate selected from the group consisting of the first starboard edge and the first port edge;

wherein each of the plurality of wheel well notches creates a space that allows the rectilinear plate to fit around the starboard wheel well and the port wheel well;

wherein the plurality of wheel well notches comprises a starboard wheel well notch and a port wheel well notch;

wherein the starboard wheel well notch is a notch that is formed in the first starboard edge of the rectilinear plate;

wherein the starboard wheel well notch is positioned to receive the starboard wheel well of the pickup truck when the rectilinear plate installs in the bed;

wherein the port wheel well notch is a notch that is formed in the first port edge of the rectilinear plate;

wherein the port wheel well notch is positioned to receive the port wheel well of the pickup truck when the rectilinear plate installs in the bed.

15. The arrangement for organizing articles according to claim 14 wherein the living hinge attaches the first bow edge of the rectilinear plate to the second stern edge of the rectangular plate such that the rectangular plate rotates with the tailgate relative to the rectilinear plate.

16. The arrangement for organizing articles according to claim 15 wherein the third port edge of the starboard sheeting attaches to the first starboard edge of the rectilinear plate such that the corner formed by the intersection of the third stern edge and the third port edge of the starboard sheeting aligns with the corner formed by the intersection of the first starboard edge and the first stern edge of the rectilinear plate;

wherein the fourth starboard edge of the port sheeting attaches to the first port edge of the rectilinear plate such that the corner formed by the intersection of the fourth stern edge and the fourth starboard edge of the port sheeting aligns with the corner formed by the intersection of the first port edge and the first stern edge of the rectilinear plate.

17. The arrangement for organizing articles according to claim 16
- wherein the third port edge of the starboard sheeting attaches to the first starboard edge of the rectilinear plate such that the third inferior surface of the starboard sheeting is in contact with the starboard sidewall as the starboard sheeting drapes over the starboard sidewall;
- wherein the fourth starboard edge of the port sheeting attaches to the first port edge of the rectilinear plate such that the fourth inferior surface of the port sheeting is in contact with the port sidewall as the port sheeting drapes over the port sidewall.

18. The arrangement for organizing articles according to claim 17
- wherein the first inferior surface of the rectilinear plate lays on the bed of the pickup truck;
- wherein the second inferior surface of the rectangular plate lays on the tailgate of the pickup truck;
- wherein the third inferior surface of the starboard saddlebag drapes over the starboard sidewall of the pickup truck;
- wherein the fourth inferior surface of the port saddlebag drapes over the port sidewall of the pickup truck.

19. The arrangement for organizing articles according to claim 17
- wherein the plurality of food trays is formed as a cavity within the first superior surface of the rectilinear plate;
- wherein the television tray is formed as a cavity within the first superior surface of the rectilinear plate;
- wherein the waste tray is formed as a cavity within the first superior surface of the rectilinear plate;
- wherein the power strip attaches the first bow edge of the first superior surface of the rectilinear plate;
- wherein the first plurality of cup holders is formed as a plurality of cavities within the second superior surface of the plurality of food trays;
- wherein the utility tray is formed as a cavity within the second superior surface of the plurality of food trays;
- wherein the starboard wheel well notch is formed in the first starboard edge of the rectilinear plate such that the starboard wheel well fits into the starboard wheel well notch;
- wherein the port wheel well notch is formed in the first port edge of the rectilinear plate such that the port wheel well fits into the port wheel well notch;
- wherein the starboard beverage block attaches to the third superior surface of the starboard sheeting such that the starboard beverage block is accessible along the interior side of the starboard sidewall;
- wherein the starboard cooler attaches to the third superior surface of the starboard sheeting such that the starboard cooler is accessible along the exterior side of the starboard sidewall;
- wherein the starboard cooler attaches to the starboard sheeting such that the bottom of the starboard cooler aligns with the third starboard edge of the starboard sheeting;
- wherein the port beverage block attaches to the fourth superior surface of the port sheeting such that the port beverage block is accessible along the interior side of the port sidewall;
- wherein the port cooler attaches to the fourth superior surface of the port sheeting such that the port cooler is accessible along the exterior side of the port sidewall;
- wherein the port cooler attaches to the port sheeting such that the bottom of the port cooler aligns with the fourth port edge of the port sheeting.

20. The arrangement for organizing articles according to claim 19
- wherein the plurality of food trays comprises a first food tray, a second food tray, a third food tray, and a fourth food tray;
- wherein the first food tray is a rectangularly shaped subdivision of the cavity formed by the plurality of food trays;
- wherein the second food tray is a rectangularly shaped subdivision of the cavity formed by the plurality of food trays;
- wherein the third food tray is a rectangularly shaped subdivision of the cavity formed by the plurality of food trays;
- wherein the fourth food tray is a rectangularly shaped subdivision of the cavity formed by the plurality of food trays.

* * * * *